2,876,085
PROCESS FOR PRODUCING GRINDING MATERIALS

Tomohiro Horie, Kyoto City, Japan

No Drawing. Original application August 10, 1953, Serial No. 373,458. Divided and this application March 20, 1957, Serial No. 651,125

2 Claims. (Cl. 51—296)

This invention relates to a process for producing grinding materials, and products thereby.

This application is a division of my prior U. S. application, Serial No. 373,458, filed August 10, 1953, now abandoned, for Process for Producing Grinding Materials and Products Thereby.

Generally speaking, this invention relates to a new type of grinding materials composed of a polyvinyl acetal bond of a texture which has independent pores connected with each other through fine capillary tubes, and which has abrasive powders or particles most evenly distributed and retained among the pores throughout the bond, and also relates to a new type of grinding materials and also products obtained by the application of such a process.

According to the process of the invention, an aqueous foamed mass of polyvinyl alcohol is formed using a surface active foaming agent, and the foamed mass together with powdery abrasives suspended therein is subjected to a catalytic acetal reaction with formaldehyde under a catalyst such as hydrochloric acid, or sulphuric acid, which may be added at any appropriate time prior to the acetal reaction beginning.

The grinding material according to this invention is composed of a spongy polyvinyl acetal bond, in which the pores are independent from each other but are connected with each other through fine capillary tubes, and having abrasive powders or particles distributed and retained evenly among the pores throughout the bond.

The texture of the bond, even distribution of abrasives and the substance constituting the bond combined together give an excellent grinding material which is especially adapted for performing the so-called "superfinish" operation.

The polyvinyl alcohol subjected to acetal reaction with formaldehyde under a catalyst has been found to be most suitable for forming a bond for holding abrasives, because the polyvinyl acetal offers, of itself, a grinding action due to its desirable elasticity, durability and hardness, while possessing a most desirable cohesive force for holding abrasives most properly.

According to this invention, a polyvinyl acetal bond having a texture possessing independent pores connected with each other through fine capillary tubes must be produced. In order to produce such a bond, it has been found that a most uniformly foamed mass of polyvinyl alcohol must be achieved. For this purpose, it has been previously suggested that an aqueous solution of polyvinyl alcohol be treated with a surface active foaming agent. This agent is added directly to an aqueous solution of polyvinyl alcohol, and subjected to stirring or agitation to give rise to a foamed mass having independent bubbles.

However, I have discovered that a most independent foamed mass of polyvinyl alcohol having independent bubbles can be produced, most easily and effectively, if a foamed mass of water, prepared separately by mixing water with a surface active foaming agent, is mixed into an aqueous solution of polyvinyl alcohol. This is believed to be due to the fact that the foamed mass of water holds its bubbles as they are, in an independent state, as the foamed mass is dispersed into the aqueous solution of polyvinyl alcohol—a surprising phenomena that has been discovered. Instead, the most difficult problem of producing a most uniformly foamed mass of polyvinyl alcohol has thus been solved according to the invention by mixing the foamed mass of water into an aqueous solution of polyvinyl alcohol.

Further, according to this invention, the problem of distributing abrasives most evenly throughout the bond has been solved by forming a foamed mass of polyvinyl alcohol having independent bubbles, completely separated from each other, and by suspending abrasives among the bubbles evenly and uniformly. This even and uniform distribution of abrasives has been heretofore a problem awaiting solution, and has been solved by the invention.

According to this invention, a foamed mass of polyvinyl alcohol is prepared as follows:

Water is mixed with a surface active foaming agent, and the mixture is subjected to a suitable mechanical stirring or agitation so as to form a foamed mass of water having independent bubbles, and then the foamed mass of water is mixed into an aqueous solution of polyvinyl alcohol, and the whole mixture is subjected to a suitable mechanical stirring or agitation so as to form a foamed mass having independent bubbles.

As surface active foaming agents may be used egg albumen, protein, gelatine, saponin or the like foaming substance, possessing a most great stability of holding up bubbles for a prolonged time.

As abrasives may be used diamond powder, silica sand, synthetic precious stone powder, or other known abrasive powders of any kind in common use.

The acetal reaction may be carried out, as is well known, in the presence of a catalyst such as hydrochloric or sulphuric acid, at room or a higher temperature.

Abrasive powders may be added at any appropriate times prior to the beginning of acetal action. It has been found most desirable to add the abrasive to the aqueous solution of polyvinyl alcohol prior to its being mixed with the foamed mass of water.

The preferred method of practice has been found to consist in mixing a foamed mass of water with an aqueous solution of polyvinyl alcohol, the polyvinyl alcohol solution having abrasives suspended therein. A catalyst, for example, hydrochloric acid, and formaldehyde are added to the mixture to indicate the acetal reaction. This mixture, viz., an acetal-reactant mixture, may, for example, be introduced into a mould vessel, and left standing at room temperature, or heated to a higher temperature, to obtain a hardened mass which may be taken out of the vessel and dried, after water-washing, to give a grinding material which may be in the form of block, wheel, stick or any other appropriate form.

The acetal-reactant mixture can be applied to a suitable base material, such as cloth, to give a buff stick as the product.

Further, it is evidently within the scope of this invention to introduce or incorporate into the polyvinyl acetal a thermohardening synthetic resin, such as phenol- or urea-formaldehyde resin, to modify the thermoplastic property of the latter. The product obtained in this way has been found especially suited to be used for grinding and cutting purposes. Alternatively, the thermo hardening resin may be impregnated within into the pores of the spongy product of the invention by treating the latter with a solution of the resin. It is evident that the impregnation should be controlled so as to retain the desired porosity of the spongy product. Instead of the thermo hardening synthetic resin, any kind of appropriate synthetic resin, or a suitable high molecular polymerization product, or even Portland cement, or gypsum, or any other appropriate inorganic substance may also be used for impregnating in a similar manner the pores of the spongy product of this invention.

Other appropriate modifications by which this invention may be carried out without departing from the spirit of the invention will be readily apparent to those skilled in the art. The invention now will be illustrated and explained by reference to the practical examples mentioned below:

Example 1

50 grs. polyvinyl alcohol in the form of a white powder were added to 310 cc. water and 80 cc. hydrochloric acid of specific gravity of 1.20, and the mixture was heated for 15 minutes at a temperature of 80° C., and thereafter cooled, to obtain an aqueous solution of polyvinyl alcohol. Separately, 100 grs. egg albumen was added to 100 cc. water and the mixture was stirred mechanically to obtain a foamed mass of water. The foamed mass was then added to the aqueous solution of polyvinyl alcohol prepared as above, and mixed uniformly, resulting in a uniformly foamed mass of polyvinyl alcohol, having an apparent volume of 800 cc., in which the bubbles were distinct independent from each other. To this foamed mass was then added powdery silica sand of 1200 mesh size in a quantity equal to one-tenth the apparent volume of the foamed mass. The foamed mass was stirred in order to suspend the silica sand uniformly throughout the foamed mass, and thereafter 100 cc. of 40% formalin was added, and the whole mass was again stirred. The mass was then poured into a cylindrical glass vessel of 90 mm. inner dia. and 3 mm. height, and left to stand at 25° C. for an hour, to harden the mass. The mass was then taken out of the vessel and dried and it was found to be a spongy material. The material was then cut into pieces of 5 mm. thickness, and immersed in water to be softened, and after a suitable removal of water content, a product was obtained, containing an appropriate amount of water. This product was suitable for use as a grinding material for optical glasses.

Example 2

20 grs. polyvinyl alcohol was added to 110 cc. water and 10 grs. urea-formaldehyde resin, and this mixture was heated so as to produce a solution. Thereafter, 270 grs. silicon carbide grain of 100 mesh was added to the solution so as to obtain a sludge. Separately, 10 cc. methyl cellulose solution was mixed with 20 cc. saponin solution of 1% concentration and 70 cc. water, and air was blown into the mixture so as to produce a foamed mass of water, having three times volume compared to the original quantity of water. The said foamed mass of water was mixed with the sludge prepared as above, and stirred so as to produce a foamed mass, to which 45 cc. hydrochloric acid, 45 cc. formaldehyde and 30 cc. methyl alcohol were added to obtain a foamed muddy mass. This mass was then poured into a mould, and kept at a temperature of 40° C., for 10–15 minutes, thereby bringing acetal reaction to completion. Then, the moulded mass was taken out of the mould and dried, after water-washing, to obtain a manufacture, viz., a synthetic grinding stone.

Example 3

40 cc. of 3% methyl cellulose solution was mixed with 10 cc. of 0.1% saponin solution, and a foamed mass was produced by stirring the mixture as air was blown thereinto. Separately, 20% polyvinyl alcohol was added to 100 cc. water, and heated to obtain a solution, to which 140 grs. of silicon carbide grains of 240 mesh were added. The resulting mixture was mixed with the foamed mass produced as above, and the whole mass was stirred thoroughly, and thereafter, 30 cc. concentrated hydrochloric acid and 35 cc. formaldehyde were added and then the resulting mixture was stirred to produce a uniform sludge. Said sludge was poured over a Vinyon cloth in a thickness of 2–3 mm., and thereafter dried at a temperature of 40° C., for 12 hours, to bring acetal reaction to completion. Thereafter, the product was rinsed with water, and after drying, given a spray of light oil, and then cut into pieces of a definite size. A plurality of such pieces were superimposed and adhered together to form a buff stone suitable for grinding.

Example 4

The grinding material obtained by the process of Example 1, of 18 mm. height, 30 mm. width and 15 mm. thickness, was impregnated with a solution of melamine resin dissolved in a paint thinner, and dried to obtain a product, viz., a grinding stone.

Example 5

A spongy sheet-like product of an annular form, obtained by the process of Example 1, was impregnated with a solution of 80 grs. phenol-formaldehyde resin dissolved in 20 grs. methanol in a ratio of 40%, and then, after drying at 40° C., pressed under hydrostatic pressure, so as to obtain a cutting blade of 0.3 mm. thickness, strengthened and possessing a highly promoted capacity. It was found that the blade was stronger and had a higher cutting capacity than similar non-impregnated blades.

In a similar manner, acryl type synthetic resins, or other types of synthetic resins may also be applied so as to obtain a similar advantageous effect.

I claim:

1. A process for producing a cellular abrasive article having abrasive particles uniformly distributed therewithin, which comprises: forming an aqueous solution of polyvinyl alcohol; separately forming a stable, aqueous, foamed mass by mixing water with a surface active foaming agent and agitating same to form a stable foam having independent pores; mixing said foamed mass, abrasive particles and said aqueous solution of polyvinyl alcohol to form a uniformly foamed, aqueous, polyvinyl alcohol mass having abrasive particles uniformly distributed throughout; incorporating a catalyst in said foamed, aqueous, polyvinyl alcohol mass, and thereafter adding and uniformly mixing formaldehyde in said foamed, aqueous, polyvinyl alcohol mass to react the formaldehyde with the polyvinyl alcohol to cause gelation and rigidification of said mass and thereby produce a cellular article having independent pores interconnected by fine capillary tubes and having abrasive particles uniformly distributed and retained in the gelled mass.

2. A process for producing a cellular abrasive article having abrasive particles uniformly distributed therewithin, which comprises: forming an aqueous solution of polyvinyl alcohol and an acid catalyst for a formalization reaction and incorporating abrasive particles therein; separately forming a stable, aqueous foamed mass by mixing water with a surface active foaming agent and agitating same to form a stable foam having independent pores; mixing said foamed mass and said aqueous solution containing abrasive particles to form a uniformly foamed, aqueous, polyvinyl alcohol mass having abrasive particles uniformly distributed throughout; thereafter adding formaldehyde to said foamed aqueous polyvinyl alcohol mass and uniformly mixing same therein to cause a reaction between the formaldehyde and the polyvinyl alcohol and thereby cause gelation and rigidification of said mass to produce a cellular article having independent pores interconnected by fine capillary tubes and having abrasive articles uniformly distributed and retained in the gelled mass.

References Cited in the file of this patent

UNITED STATES PATENTS

| | | |
|---|---|---|
| 2,609,347 | Wilson | Sept. 2, 1952 |
| 2,653,917 | Hammond | Sept. 23, 1953 |
| 2,668,153 | Hammond | Feb. 2, 1954 |